US012617649B2

(12) United States Patent
Inokuchi

(10) Patent No.: US 12,617,649 B2
(45) Date of Patent: May 5, 2026

(54) PAPER CREASING DEVICE AND PRINTER

(71) Applicants: CITIZEN WATCH CO., LTD., Tokyo (JP); CITIZEN SYSTEMS JAPAN CO., LTD., Tokyo (JP)

(72) Inventor: Yutaka Inokuchi, Nagano (JP)

(73) Assignees: CITIZEN WATCH CO., LTD., Tokyo (JP); CITIZEN SYSTEMS JAPAN CO., LTD., Tokyo (JP)

( * ) Notice: Subject to any disclaimer, the term of this patent is extended or adjusted under 35 U.S.C. 154(b) by 0 days.

(21) Appl. No.: 18/715,005

(22) PCT Filed: Nov. 25, 2022

(86) PCT No.: PCT/JP2022/043568

§ 371 (c)(1),
(2) Date: May 30, 2024

(87) PCT Pub. No.: WO2023/112640

PCT Pub. Date: Jun. 22, 2023

(65) Prior Publication Data

US 2025/0026604 A1 Jan. 23, 2025

(30) Foreign Application Priority Data

Dec. 15, 2021 (JP) ................................ 2021-203273

(51) Int. Cl.
*B65H 45/16* (2006.01)
*B41J 2/325* (2006.01)
(Continued)

(52) U.S. Cl.
CPC .............. *B65H 45/16* (2013.01); *B41J 2/325* (2013.01); *B41J 11/0015* (2013.01);
(Continued)

(58) Field of Classification Search
CPC .................... B65H 45/12; B65H 45/16; B65H 2301/452; B65H 2301/51212; B31F 1/08; B31F 1/10; B31B 50/36
(Continued)

(56) References Cited

U.S. PATENT DOCUMENTS 8,831,503 B2 * 9/2014 Hoover ..................... B31F 1/08
399/407
2006/0116263 A1 6/2006 Rathbun et al.
(Continued)

FOREIGN PATENT DOCUMENTS

DE 19629674 C1 * 1/1998 ............. B65H 45/16
JP S4541621 B1 12/1970
(Continued)

OTHER PUBLICATIONS

International Search Report from corresponding International Application No. PCT/JP2022/043568, mailed on Jan. 17, 2023, 4 pages.
Extended European Search Report from corresponding Application No. 22907171.7 mailed on Feb. 6, 2026, 7 pages.

*Primary Examiner* — Linda J. Hodge
(74) *Attorney, Agent, or Firm* — Tucker Ellis LLP

(57) ABSTRACT

A paper creasing device includes a receiving member including a groove extending in a fixed direction; a rotary blade movable along the groove; and a movement mechanism for moving the rotary blade along the groove at a fixed height in a range between first and second edges of paper in a width direction, the paper being placed on an upper surface of the receiving member. The receiving member is formed to have shearing forces applied to the paper sandwiched between the rotary blade and the groove in an outside range and an inside range in the width direction of the receiving member, the outside range corresponding to at least one of the paper edges located on a side where the rotary blade starts contacting the paper when moving along the groove,
(Continued)

and the shearing force in the outside range being smaller than the shearing force in the inside range.

6 Claims, 10 Drawing Sheets

(51) Int. Cl.
*B41J 11/00* (2006.01)
*B65H 45/30* (2006.01)

(52) U.S. Cl.
CPC ....... *B65H 45/30* (2013.01); *B65H 2301/452* (2013.01); *B65H 2801/24* (2013.01)

(58) Field of Classification Search
USPC ............................................ 493/59, 81, 356
See application file for complete search history.

(56) References Cited

U.S. PATENT DOCUMENTS

| | | | |
|---|---|---|---|
| 2008/0211159 A1 | 9/2008 | Iijima et al. | |
| 2014/0151949 A1 | 6/2014 | Hoshino | |
| 2014/0152752 A1 | 6/2014 | Hoshino | |
| 2020/0237572 A1* | 7/2020 | Giffey | A61F 13/15747 |

FOREIGN PATENT DOCUMENTS

| | | | |
|---|---|---|---|
| JP | S54128517 U | 9/1979 | |
| JP | S62173029 A | 7/1987 | |
| JP | 2012126536 * | 7/2012 | B31F 1/08 |
| WO | WO-2015145796 A1 * | 10/2015 | B26D 3/14 |

* cited by examiner

SECT.A-A

SECT.B-B

DETAIL A

PAPER CREASING DEVICE AND PRINTER

CROSS-REFERENCE TO RELATED APPLICATIONS

The present application is based upon and claims the benefit of priority of Japanese Patent Application No. 2021-203273, filed with the Japan Patent Office on Dec. 15, 2021, the entire disclosure of which is completely incorporated herein by reference.

TECHNICAL FIELD

The present disclosure relates to a paper creasing device and a printer.

BACKGROUND ART

A paper creasing device or a creaser is known as a post-processing device for printing. The creasing device is configured to form creases or folds on paper having stiffness (high rigidity), such as relatively thick paper. When binding a plurality of sheets of the paper having stiffness described above, each of the pages is not sufficiently open if an attempt is made to turn the paper and open each page and the spreadability of the book becomes poor.

Further, for example, a resin layer (a receiving layer) that receives dye is formed on each side of the paper which serves as a core, a photograph or the like is printed on each of the resin layers. Then, a plurality of sheets of the printed paper are bound to form a photo book. In such a photo book, the spreadability of the book may become poor similar to the paper described above.

Given the above, a crease is formed near the bound portion in advance by using a creasing device. The formed crease serves as a fold so that the sheet of the bounded paper can be sufficiently opened at the time of opening the book. As a result, the spreadability can be improved.

Furthermore, some greeting cards are finished such that a person who has received a card opens the card that has been folded in the center. In such a case, a crease is formed in a portion to be folded in the center of the paper, and this prevents a fold from opening due to the stiffness of the paper, and the card with a satisfactory finish can be obtained.

The creasing device sandwiches paper between a groove that extends in a predetermined direction and a blade that is fitted into the groove to form a crease. Here, an example of the creasing device is a rotary creasing device that uses a rotary blade that rotates along a groove (see, for example, Patent Literature 1: JP 2014-111496 A).

In the rotary creasing device, paper is placed on a receiving member including the groove, and the rotary creasing device presses the rotary blade against a portion that corresponds to the groove of the paper and rotates and moves the rotary blade along the groove to form a crease along the groove.

SUMMARY

The rotary creasing device creates a shearing force applied to the paper between the rotary blade and the groove of the receiving member. When the rotary blade starts contacting an edge of the paper where a crease is beginning to be formed, the stress is concentrated at a contact point and the paper is likely to be cut.

In view of this, it is conceivable that the height of the rotary blade is changed at the edge of the paper such that the rotary blade is slightly moved away from the groove, thereby reducing the shearing applied to the edge of the paper and preventing the paper from being cut.

However, changing the height of the rotary blade requires a configuration that changes the shape of a track of the rotary blade or supports the rotary blade with an elastic body, resulting in a complicated structure and an increase in manufacturing cost.

The present disclosure has been made in view of the circumstances described above. An object of the present disclosure is to provide a paper creasing device that can prevent paper from being cut with a simple configuration and a printer that includes the paper creasing device.

A first aspect of the present disclosure relates to a paper creasing device, the paper creasing device including a receiving member that comprises a groove extending in a fixed direction; a rotary blade that is movable along the groove; and a movement mechanism that is configured to move the rotary blade along the groove at a fixed height in a range between first and second edges of the paper in a width direction. The paper is placed on an upper surface of the receiving member. The receiving member is formed to have shearing forces applied to the paper sandwiched between the rotary blade and the groove in an outside range and an inside range in the width direction of the receiving member. The outside range corresponds to at least one of the first and second edges of the paper that is located on a side where the rotary blade starts contacting the paper when the rotary blade moves along the groove. The shearing force in the outside range is smaller than the shearing force in the inside range.

A second aspect of the present disclosure is a printer that includes the paper creasing device according to the present disclosure.

DETAILED DESCRIPTION

Embodiments of a paper creasing device and a printer that includes the paper creasing device according to the present disclosure will be described with reference to the drawings.

Figure 1:
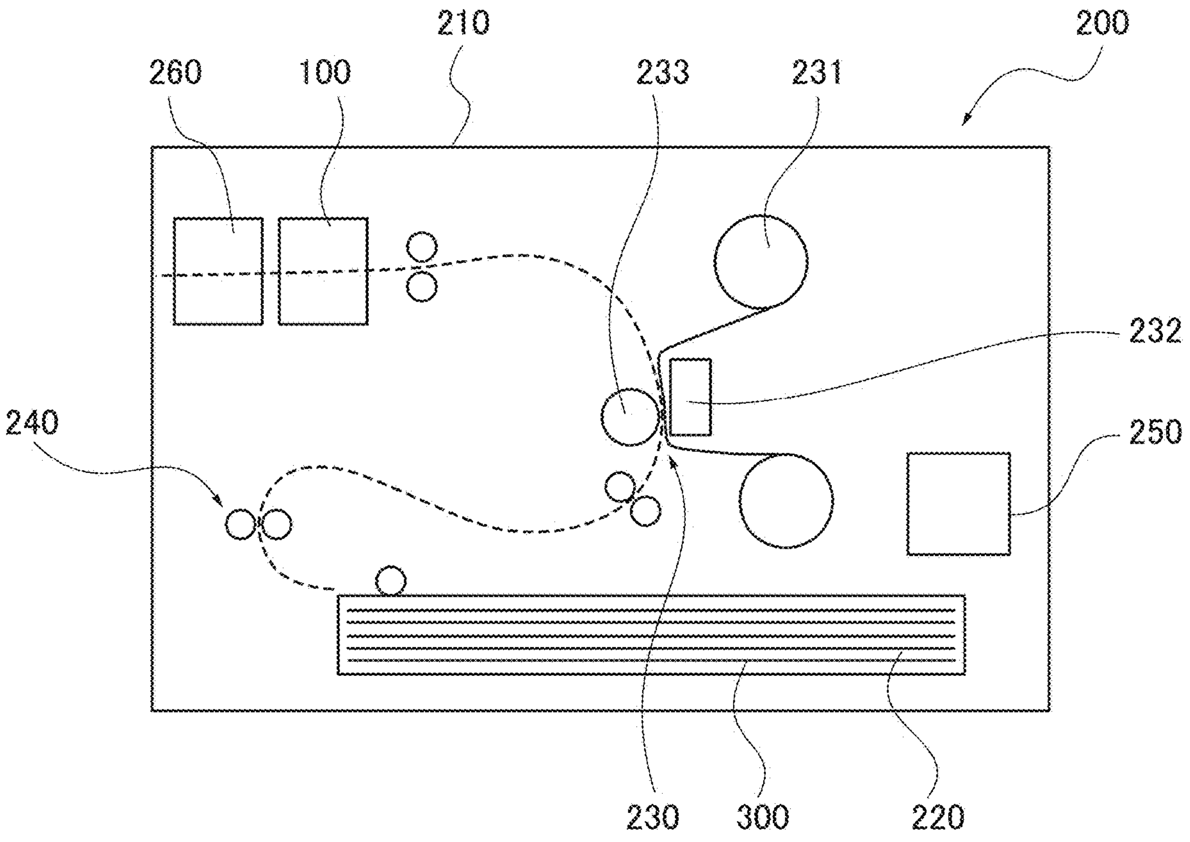
FIG. 1 is a schematic view illustrating a photo printer that includes a creasing device for paper (or a paper creasing device).

(Configuration of Printer) FIG. 1 is a schematic view illustrating a photo printer 200 that includes a creasing device 100 of paper 300 (hereinafter referred to as a creasing device or paper creasing device 100).

The photo printer 200 (hereinafter simply referred to as a printer 200) is a dye sublimation thermal transfer printer. The printer 200 is configured to perform printing by applying heat to an ink ribbon 231 with a thermal head 232 to diffuse and transfer sublimation dye applied to the ink ribbon 231 onto the paper 300 that has been crimped onto the ink ribbon 231 by the thermal head 232 and a platen roller 233.

For example, the paper 300 includes core paper serving as a core including front and back surfaces to which a plurality of resin layers (receiving layers) is applied or attached. Accordingly, the paper 300 has a certain degree of rigidity. The paper 300 has a thickness of, for example, 200 [μm]. However, the thickness of the paper 300 is not limited to 200 [μm].

The sublimation dye of the ink ribbon 231 described above is diffused and transferred onto the resin layer of the uppermost surface of the paper 300. The printer 200 is a sheet-fed printing press that performs printing on both sides of the paper 300. The paper 300 is a flat paper cut into a rectangle.

The printer 200 is an embodiment of the printer according to the present disclosure. The printer 200 includes, within an outer case 210, a paper storage portion 220, a printing portion 230, a conveyor portion 240, a creasing device 100, a cutter 260, and a controller 250 as illustrated in FIG. 1.

The outer case 210 has an outer shape that is substantially rectangular parallelepipedal. The paper storage portion 220 is a space for storing the paper 300 on which the photo printer 200 will perform printing. The paper storage portion 220 stores a plurality of sheets of the paper 300, which is a flat sheet, in a stacked state in a thickness direction.

The printing portion 230 includes the ink ribbon 231, the thermal head 232, and the platen roller 233. The ink ribbon 231 is coated with ink. The thermal head 232 performs printing by applying heat to the ink ribbon 231 and diffusing and transferring the sublimation dye of the ink ribbon 231 onto the resin layer of the paper 300 disposed to face the ink ribbon 231. The platen roller 233 crimps the paper 300 onto the ink ribbon 231 together with the thermal head 232.

The conveyor portion 240 is configured to convey the paper 300 within the paper storage portion 220 to the printing portion 230, to convey the paper 300 on which printing has been performed by the printing portion 230 to the creasing device 100, which is described later, and to discharge the paper 300 to an outside of the printer 200 after the cutter 260 cuts an end of the paper 300 which has been creased by the creasing device 100.

The conveyor portion 240 includes a conveying path, a conveyor roller and a power transmission mechanism, a sensor, and a motor. The conveyor roller and the power transmission mechanism move the paper 300 along the conveying path. The sensor is provided on the conveying path to detect the paper 300. The motor applies conveying force to the power transmission mechanism. The sensor is an optical sensor such as a photo reflector or a photo interrupter. However, the sensor may be a mechanical sensor that uses a contactor.

The controller 250 is configured to control operations of the printing portion 230, the conveyor portion 240, the cutter 260, and the creasing device 100, respectively. The controller 250 controls the operation of the motor based on the detection result of the paper 300 by the sensor in the conveyor portion 240, for example.

Furthermore, the controller 250 controls the conveyor portion 240 and the printing portion 230 based on printing data stored before printing to print, on the paper 300, the content (for example, a visible image such as a landscape photograph or a snapshot) that corresponds to the printing data.

Moreover, the controller 250 controls the conveyor portion 240 and the creasing device 100 in accordance with an operation command set in advance for the printed paper 300 to form a linear crease in a specified position such as the vicinity of the end of the paper 300 or the center of the paper 300.

Figure 2:
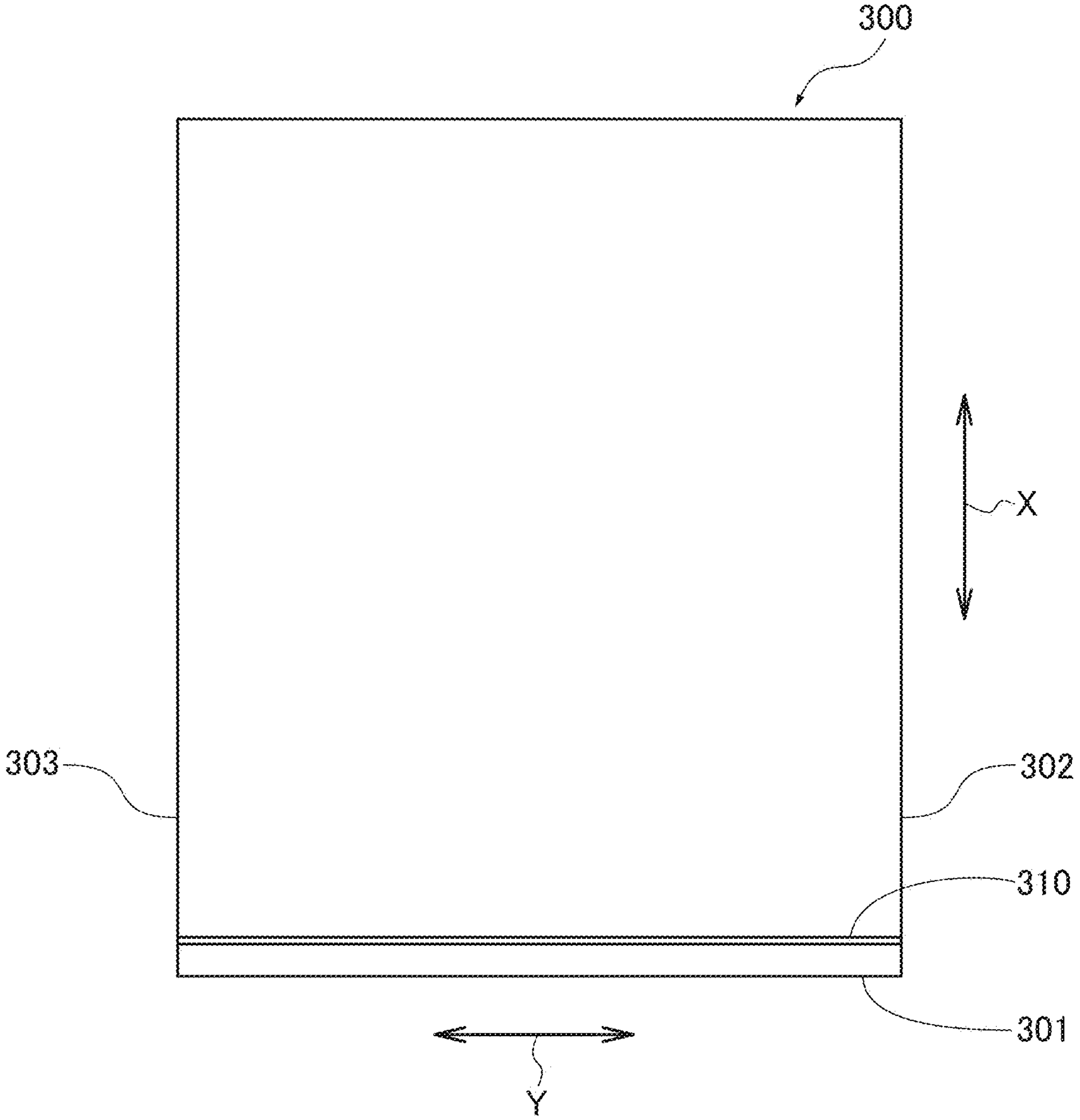
FIG. 2 is a schematic view illustrating a crease formed in a width direction of the paper.

(Configuration of Creasing Device) FIG. 2 is a schematic view illustrating a crease 310 formed in a width direction Y of the paper 300. As illustrated in FIG. 2, the creasing device 100 forms the crease 310 near a front edge 301 in the conveying direction X in the paper 300 on which printing has been performed by the printing portion 230. The crease 310 extends straight parallel to the width direction Y (a direction orthogonal to a conveying direction X of the conveyor portion 240) of the paper 300. This crease 310 is a recess that induces a fold habit. The recess of the crease 310 is formed by placing the paper 300 on a receiving member 120 including a groove 124 and pressing a blade from the top of the paper 300 onto the paper 300.

Figure 3:
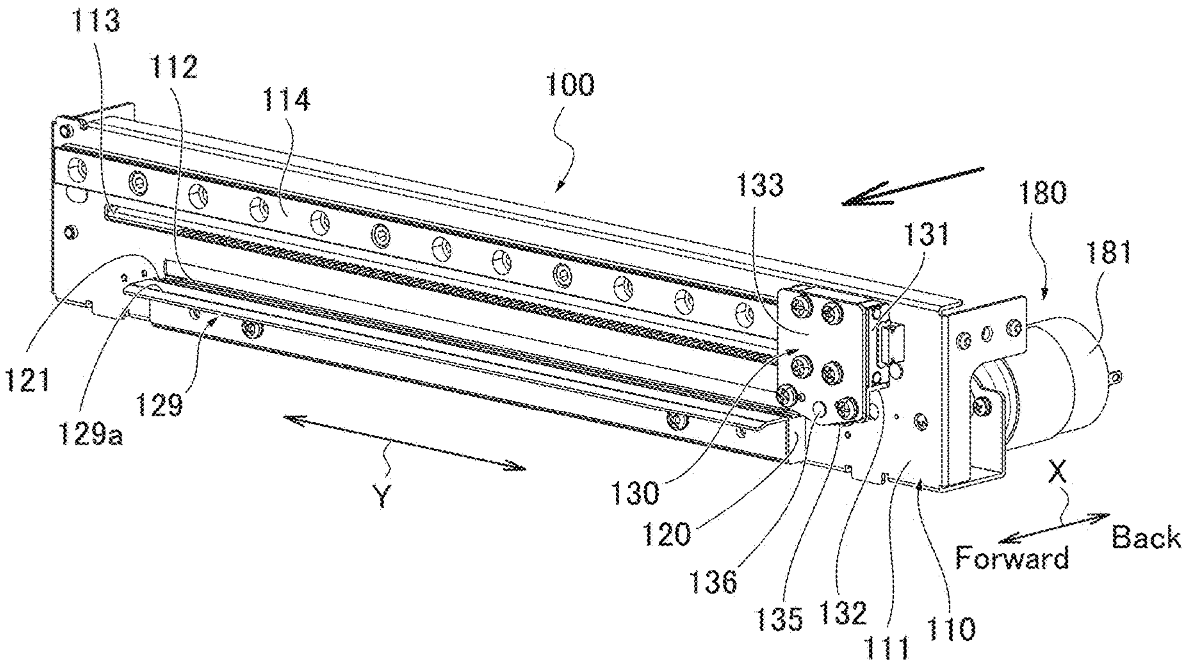
FIG. 3 is a perspective view illustrating a modularized creasing device when viewed from a front side in a conveying direction X.
Figure 4:
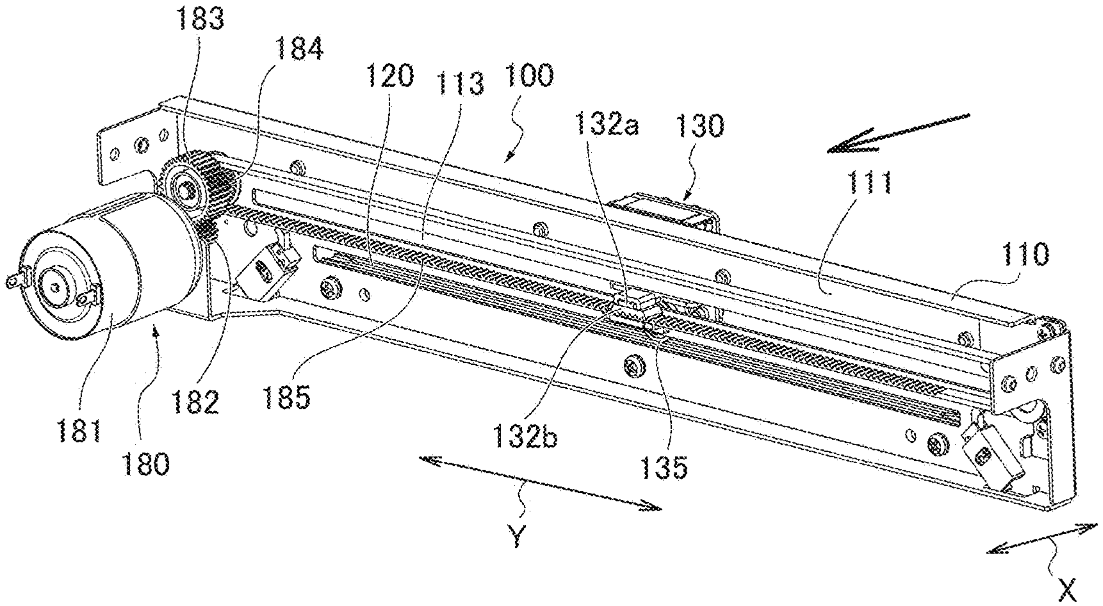
FIG. 4 is a perspective view illustrating the creasing device illustrated in FIG. 3 when viewed from a rear side in the conveying direction X.

The creasing device 100 is an embodiment of the creasing device according to the present disclosure. As illustrated in FIGS. 3 and 4, the creasing device 100 includes the receiving member 120, a rotary blade unit 130, and a movement mechanism 180. The receiving member 120, the rotary blade unit 130, and the movement mechanism 180 described above are provided in a frame 110, which is a skeletal structure made of metal plate, modularized, and then incorporated into the printer 200.

The frame 110 includes a vertical plate 111 that extends in a vertical direction including the width direction Y of the paper 300. The vertical plate 111 includes a long hole 112 extending in the width direction Y so that the paper 300 passes through the long hole 112 as a flat sheet. The vertical plate 111 also includes a guide hole 113 above the long hole 112. The guide hole 113 is longer in the width direction Y than the long hole 112. The frame 110 also includes a guide rail 114 on the front side of the vertical plate 111 above the guide hole 113. The guide rail 114 extends parallel to the long hole 112 and the guide hole 113.

Figure 5:
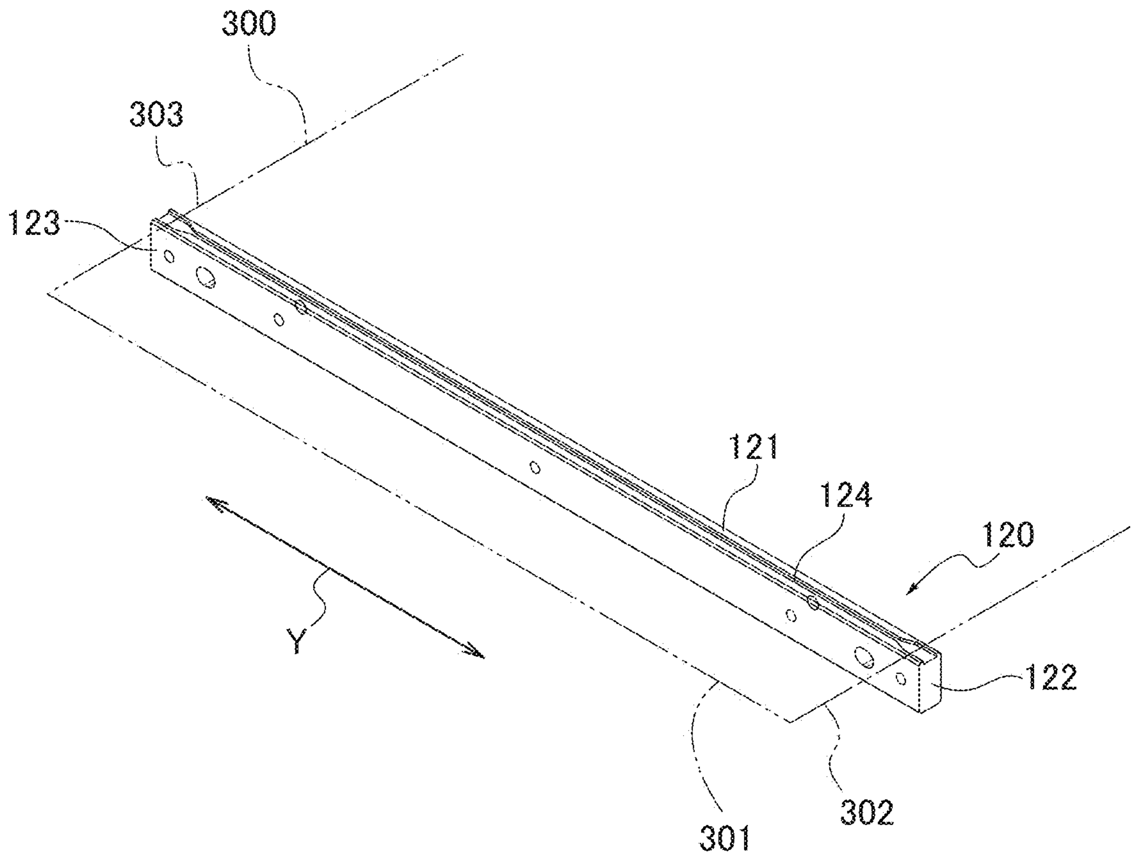
FIG. 5 is a perspective view illustrating a receiving member.
Figure 6:
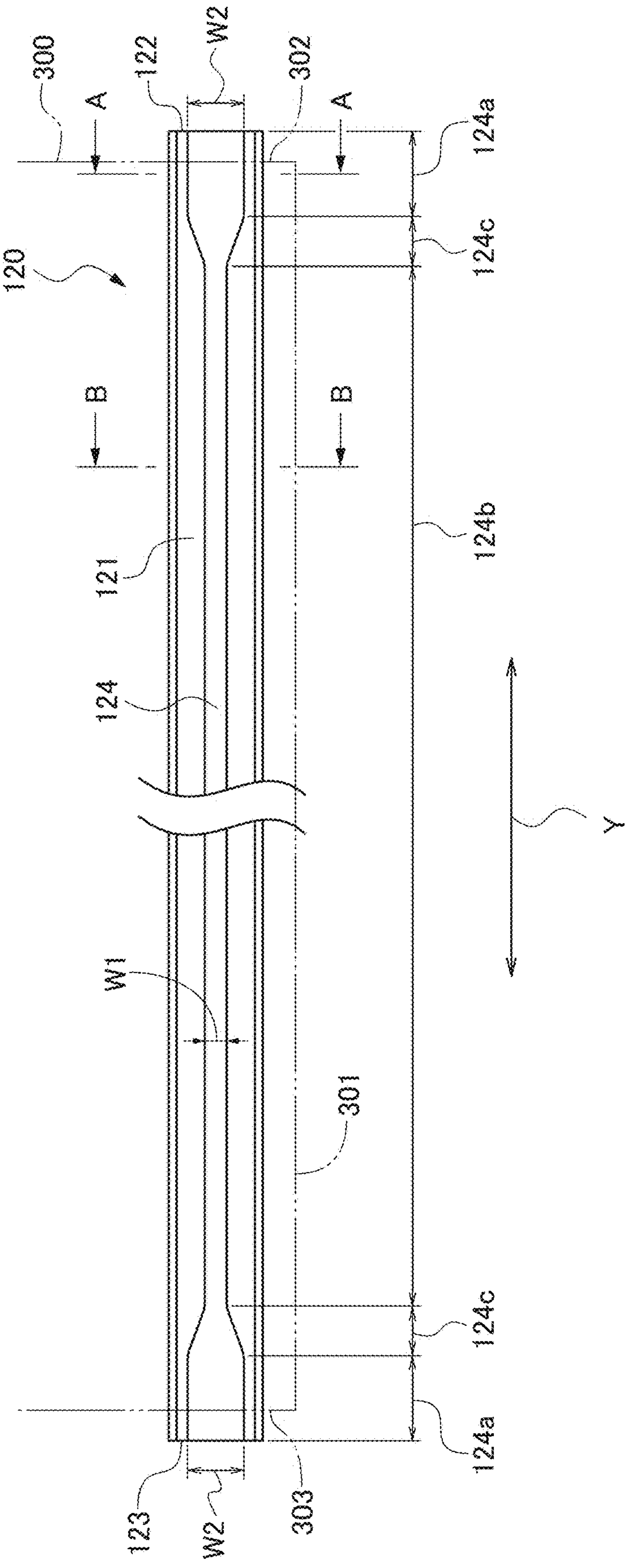
FIG. 6 is a plan view illustrating a groove formed on an upper surface of the receiving member.

FIG. 3 is a perspective view illustrating the modularized creasing device 100 as viewed from the front side in the conveying direction. FIG. 4 is a perspective view illustrating the creasing device 100 illustrated in FIG. 3 as viewed from the rear side in the conveying direction X. FIG. 5 is a perspective view illustrating the receiving member 120. FIG. 6 is a plan view illustrating the groove 124 formed on an upper surface 121 of the receiving member 120.

As illustrated in FIG. 3, the receiving member 120 is integrally fixed to the paper guide member 129, which is described later, in a lower portion of the frame 110 on the front side in the conveying direction X such that the upper surface 121 of the receiving member 120 extends along a lower edge of the long hole 112. As illustrated in FIGS. 5 and 6, the receiving member 120 is formed into a quadrangular prism shape that extends longitudinally in the width direction Y of the paper 300. A length in the longitudinal direction (width direction Y) of the receiving member 120 is slightly longer than the width of the paper 300.

The paper 300 is placed on the upper surface 121 of the receiving member 120, which is one of the surfaces of the quadrangular prism. The upper surface 121 includes the groove 124 extending linearly in the longitudinal direction of the receiving member 120. Details of the groove 124 will be described later.

As illustrated in FIG. 3, the paper guide member 129 is fixed to the front surface in the conveying direction X of the receiving member 120. The length of the paper guide member 129 is the same as that of the receiving member 120. The paper guide member 129 has a substantially inverted L-shaped cross-section on a vertical plane including the conveying direction X. In addition, the paper guide member 129 includes a vertical plate corresponding to a vertical portion of the L-shape and a horizontal plate corresponding to a horizontal portion of the L-shape. The paper guide member 129 is disposed such that the vertical plate is fixed to the front surface of the receiving member 120 and the horizontal plate projects forward in the conveying direction X.

An upper surface 129*a* of the horizontal plate of the paper guide member 129 is set in a position that is as high as the upper surface 121 of the receiving member 120. The paper 300 passes through the long hole 112 in the frame 110 and is delivered from the upper surface 121 of the receiving member 120 to the upper surface 129*a* of the paper guide member 129. When the paper 300 advances from the upper surface 121 of the receiving member 120 to the upper surface 129*a* of the paper guide member 129, the upper surface 129*a* guides the bottom side of the paper 300 so that the front edge 301 (see FIG. 2) of the paper 300 smoothly moves onto the upper surface 129*a* without being caught by the vertical wall of the paper guide member 129.

Figure 7:
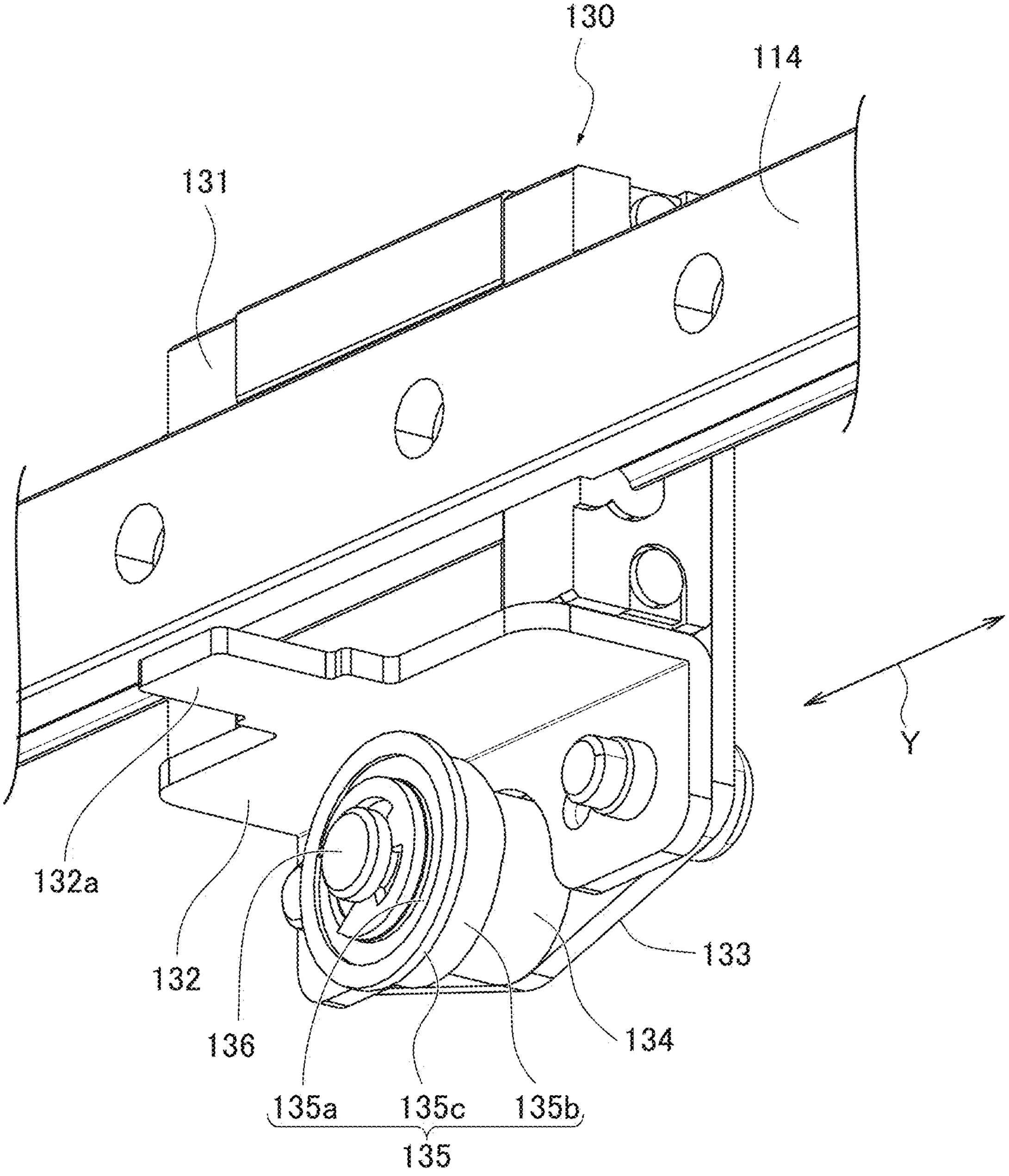
FIG. 7 is a perspective view illustrating a rotary blade unit.

FIG. 7 is a perspective view illustrating the rotary blade unit 130. As illustrated in FIGS. 3 and 4, the rotary blade unit 130 is disposed on the front surface of the vertical plate 111 of the frame 110 in the conveying direction X. As illustrated in FIGS. 3, 4, and 7, the rotary blade unit 130 integrally includes a guided member 131, an engaging plate 132, a holding plate 133, a collar 134, a rotary blade 135, and a support shaft 136.

The guided member 131 slidably engages with the guide rail 114 to be movable in the longitudinal direction (the width direction Y) of the guide rail 114 without rattling. The guide rail 114 and the guided member 131 function as a linear guide that linearly guides the rotary blade unit 130 at a predetermined height in the width direction Y.

The holding plate 133 is fixed to the front surface in the conveying direction X of the guided member 131. The holding plate 133 is longer than the guided member 131 in an upward/downward direction to extend downward from the guided member 131. In addition, the support shaft 136 that extends to a rear side in the conveying direction X is press-fitted and fixed to a portion of the holding plate 133 extending downward.

The collar 134 is disposed in a portion of the support shaft 136 that projects to a rear side in the conveying direction X from the holding plate 133. The collar 134 penetrates the support shaft 136. The rotary blade 135 is fixed to a rear side portion of the collar 134 to be rotatable about the support shaft 136.

The rotary blade 135 is configured with a radial bearing that is integrally provided with a flange 135*c*. Specifically, the support shaft 136 is fitted into an inner ring 135*a* of the radial bearing, and an outer ring 135*b* of the radial bearing is rotatable about the support shaft 136. In addition, the flange 135*c* is integrally formed with the outer ring 135*b* of the radial bearing. The flange 135*c* outwardly projects in a radial direction of the radial bearing and has an annular shape.

The flange 135*c* moves along the groove 124 of the receiving member 120 when being moved in the width direction Y by the linear guide described above. In other words, the function of a blade is performed in the creasing device 100, in which an outer peripheral portion of the flange 135*c* enters the groove 124. The flange 135*c* has a thickness (a blade thickness) W3 in the conveying direction X that is smaller than a width W1 (a groove width W1) of the groove 124 (i.e., W3<W1).

The blade thickness W3 is 0.6 [mm], for example. However, a numerical value specifically applied to the blade thickness W3 is not limited to 0.6 [mm]. The flange 135*c* is set such that the center of the blade thickness moves along the center of the groove width of the groove 124.

The lowermost surface of the flange 135*c* is positioned to be lower than the upper surface 121 of the receiving member 120 by, for example, 0.2 [mm]. Specifically, the rotary blade 135 moves along the groove 124 in a state where the lowermost surface of the flange 135*c* enters the groove 124 by 0.2 [mm] when the rotary blade 135 moves in the width direction Y.

The engaging plate 132 is fixed to the holding plate 133. The engaging plate 132 is formed to have a substantially inverted L-shaped cross-section on a vertical plane including the conveying direction X. The engaging plate 132 includes a vertical plate portion corresponding to a vertical portion of the L-shape and a horizontal plate portion corresponding to a horizontal portion of the L-shape. The vertical plate portion is fixed to the holding plate 133, and the horizontal plate portion is provided with an engaging piece 132*a* that projects to the rear side in the conveying direction X.

The engaging piece 132*a* passes through the guide hole 113 formed in the vertical plate 111 of the frame 110 and projects to the rear side of the vertical plate 111 to be fixed to a timing belt 185 with a fixing member 132*b* as illustrated in FIG. 4. The timing belt 185 is displaced along an outer peripheral portion of the guide hole 113.

This configuration allows the rotary blade unit 130 to move in the width direction Y in accordance with the displacement of the timing belt 185. The rotary blade unit 130 moves while maintaining a horizontal state. The flange 135*c* functioning as the blade of the rotary blade 135 is movable along the groove 124 of the receiving member 120 without changing a position in a height direction relative to the groove 124.

The movement mechanism 180 is configured to move the rotary blade 135 along the groove 124. As illustrated in FIG. 4, the movement mechanism 180 is disposed on the rear side of the vertical plate 111 of the frame 110. The movement mechanism 180 includes a DC motor 181, a pinion gear 182 that is fixed to a shaft of the DC motor 181, an intermediate gear 183 that meshes with the pinion gear 182, a driving gear 184 that is provided coaxially with the intermediate gear 183, and the timing belt 185 that includes a linear gear that meshes with the driving gear 184 on an inner peripheral surface.

The timing belt 185 is disposed outside the contour of the guide hole 113. The fixing member 132*b* is fixed to the linear gear. The fixing member 132*b* engages with the engaging piece 132*a* that passes through the guide hole 113 and projects to the rear side in the conveying direction X.

The timing belt 185 rotates by the rotation of the DC motor 181, and the rotary blade unit 130 that is fixed to the timing belt 185 horizontally moves in the width direction Y at a fixed height. The moving range of the rotary blade 135 by the movement mechanism 180 is set between a first position outside of a first end surface 122 of the receiving member 120 and a second position outside of a second end surface 123 of the receiving member 120 in the width direction Y.

The movement mechanism 180 switches the rotating direction of the DC motor to switch the moving range of the rotary blade 135 from the second position outside of the second end surface 123 of the receiving member 120 to the first position outside of the first end surface 122 in the width direction Y, which allows the rotary blade 135 to reciprocally move at a fixed height in the width direction Y.

It is sufficient that the moving range of the rotary blade 135 at a fixed height is at least between the first side edge 302 and the second side edge 303 of the paper 300 (i.e., range of creasing the paper 300). The height of the rotary blade 135 may be changed outside the first side edge 302 or the second side edge 303 of the paper 300 in the width direction Y.

Next, the groove 124 in the receiving member will be described. The paper 300 that has passed through the long hole 112 is placed on the upper surface 121 of the receiving member 120, as illustrated in FIG. 6. At this time, the paper 300 is positioned in the width direction Y such that the entire region in the width direction Y of the paper 300 is placed on the upper surface 121.

Specifically, the first side edge 302 (edge 302 in the width direction Y) of the paper 300 is placed inside the first end surface 122 of the receiving member 120 in the width direction Y, and the second side edge 303 (edge 303 in the width direction Y) of the paper 300 is placed inside the second end surface 123 of the receiving member 120 in the width direction Y.

The groove 124 includes ranges each having a predetermined length, i.e., outside ranges 124*a* and an inside range 124*b* in the width direction Y. The outside range 124*a* includes a starting portion corresponding to the edge 302 of the paper 300 disposed on the groove 124. The edge 302 is located on a side in the width direction Y that the rotary blade 135 starts contacting when the rotary blade 135 moves from the first end surface 122 side to the second end surface 123 side along the groove 124. The width W of the groove 124 is wider in the outside range 124*a* than in the inside range 124*b*.

Also, the outside range 124*a* includes a starting portion corresponding to the edge 303 of the paper 300 disposed on the groove 124. The edge 303 is located on a side in the width direction Y that the rotary blade 135 starts contacting when the rotary blade 135 moves from the second end surface 123 side to the first end surface 122 side along the groove 124. The width W of the groove 124 is also wider in the outside range 124*a* than in the inside range 124*b*.

Specifically, the groove 124 has a fixed width W1 in the inside range 124*b* in the width direction Y of the paper 300 in a state where the paper 300 is placed on the groove 124. The fixed width W1 is, for example, 1.2 [mm]. However, the fixed width W1 is not limited to 1.2 [mm].

Furthermore, the groove 124 has a fixed groove width W2 in each of the outside ranges 124*a* among ranges between ends including the first and second side edges 302, 303 in the width direction Y of the paper 300. The outside ranges 124*a* extend across the first and second side edge 302, 303 of the paper 300, respectively. Each of the outside ranges 124*a* has a predetermined length from each of the first and second end surfaces 122, 123 of the receiving member 120. The fixed groove width W2 is greater than the groove width in the inside range 124*b* (>W1).

The outside range 124*a* of the groove 124 includes a portion where the rotary blade 135 starts contacting the edge 302 or 303 of the paper 300 when the rotary blade 135 moves along the groove 124.

The fixed groove width W2 is, for an example, 4.0 [mm]. However, the fixed groove width W2 is not limited to 4.0 [mm].

The center in the groove width direction (the conveying direction X) of the groove 124 in the outside range 124*a* is coincident with the center in the groove width direction (the conveying direction X) of the groove 124 in the inside range 124*b*.

Furthermore, a connection range 124*c* is provided between the outside range 124*a* and the inside range 124*b* of the groove 124. The connection range 124*c* has a groove width W gradually decreasing from the groove width W2 of the outside range 124*a* to the groove width W1 of the inside range 124*b*. For example, the groove width W of the connection range 124*c* changes from the groove width W2 of the outside range 124*a* to the groove width W1 of the inside range 124*b* in the longitudinal direction (direction Y) of the receiving member 120 from the outside range 124*a* to the inside range 124*b*. In other words, the groove 124 in the connection range 124*c* has a contour linearly inclined relative to the longitudinal direction.

In the creasing device 100 configured as described above, the crease 310 is formed as a trace of the movement of the flange 135*c* of the rotary blade 135 on the paper 300 sandwiched between the flange 135*c* and the groove 124 when the rotary blade 135 moves in the width direction Y from the side of the first end surface 122 to the side of the second end surface 123 of the receiving member 120 in the range where the rotary blade 135 is moved by the movement mechanism 180 in a state where the paper 300 is placed on the upper surface 121 of the receiving member 120.

Figure 8:
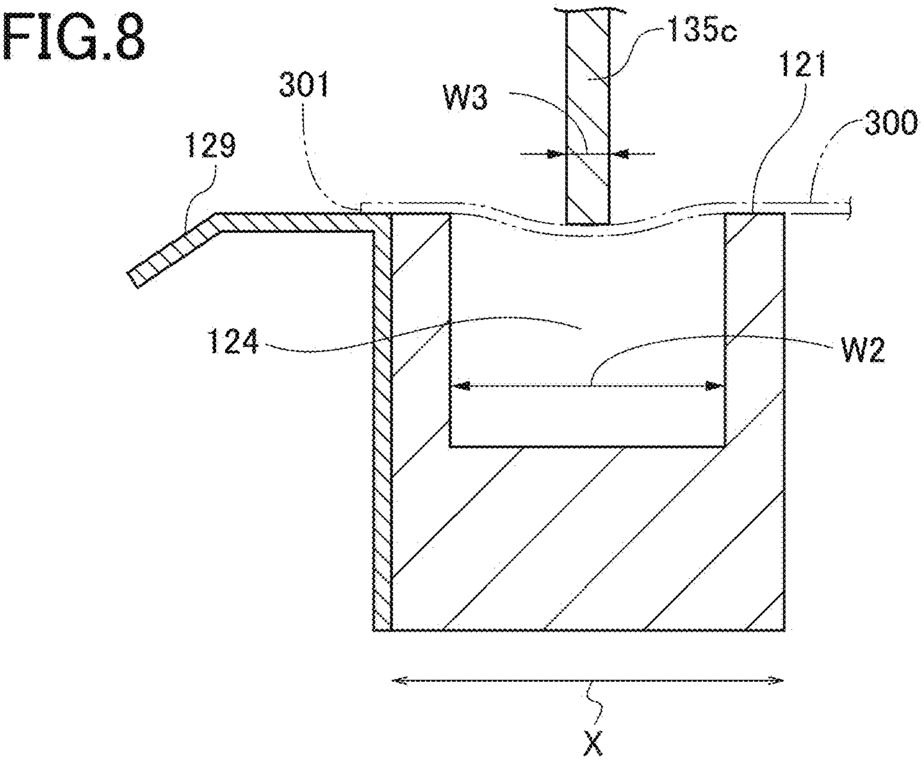
FIG. 8 is a cross-sectional view illustrating a cross-section on a plane along a line A-A in FIG. 6.
Figure 9:
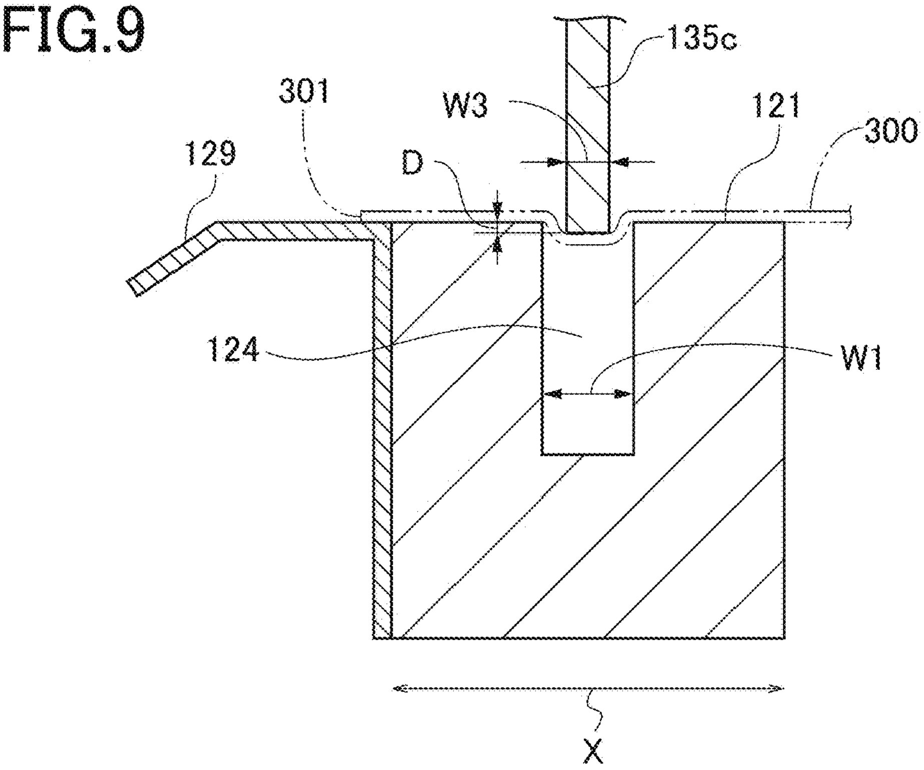
FIG. 9 is a cross-sectional view illustrating a cross-section on a plane along a line B-B in FIG. 6.

FIG. 8 is a cross-sectional view illustrating a cross-section on a plane along line A-A (corresponding to the outside range 124*a*) in FIG. 6. FIG. 9 is a cross-sectional view illustrating a cross-section on a plane along line B-B (corresponding to the inside range 124*b*) in FIG. 6.

The flange 135*c* of the rotary blade 135 starts contacting with the edge 302 of the paper 300 in the outside range 124*a* having the wider groove width W2 illustrated in FIG. 6.

In addition, as illustrated in the cross-section of FIG. 8, in the outside range 124*a*, the groove width W2 of the groove 124 relative to the blade thickness W3 of the flange 135*c* functions as the blade is wider than the groove width W1 of the groove 124 relative to the blade thickness W3 of the flange 135*c*. Specifically, the groove width W2 is about three times wider than the groove width W1.

On the other hand, it is the inside range 124*b* having the narrower groove width W1 as illustrated in FIG. 6 in a state where the flange 135*c* of the rotary blade 135 is in contact with the range inside the end of the paper 300 in the width direction Y.

In addition, as illustrated in the cross-section of FIG. 9, in the inside range 124*b*, the groove width W1 of the groove 124 relative to the blade thickness W3 of the flange 135*c* functioning as the blade is narrower than the groove width W2 of the groove 124 relative to the blade thickness W3 of the flange 135*c*.

Accordingly, a shearing force applied to the paper 300 sandwiched between the flange 135*c* and the groove 124 in the inside range 124*b* is greater than a shearing force applied to the paper 300 sandwiched between the flange 135*c* and the groove 124 in the outside range 124*a*. As a result, a crease 310 is formed with a clear linear contour in the inside range of the paper 300 in the width direction Y.

On the other hand, the shearing force applied to the paper 300 sandwiched between the flange 135*c* and the groove 124 in the outside range 124*a* is smaller than the shearing force applied to the paper 300 sandwiched between the flange 135*c* and the groove 124 in the inside range 124*b*. As a result, the crease 310 formed at the end including the edge 302 of the paper 300 has a contour that is vaguer than the contour of the crease 310 formed in the range in the paper 300 corresponding to the inside range 124*b*.

If the groove width W2 of the outside range 124*a* corresponding to the edge 302 of the paper 300 is formed to be as narrow as the groove width W1 of the inside range 124*b* (i.e., W2=W1), a relatively strong shearing force acts on the edge 302 and thus the paper 300 may be cut when the flange 135*c* of the rotary blade 135 starts contacting the edge 302 of the paper 300.

Specifically, the paper 300 is planarly continuous in the moving direction of the rotary blade 135 in a region inside the edge 302 of the paper 300. A portion of the paper 300 through which the rotary blade 135 passes sandwiched between the groove 124 and the rotary blade 135 plastically deforms in a crease shape. Since the paper 300 is planarly continuous, a portion that the rotary blade 135 has not yet reached locally receives an influence to be pulled by the plastically deformed portion and starts deforming in the crease shape.

On the other hand, the edge 302 of the paper 300 is sandwiched between the groove 124 and the rotary blade 135 from the state of no plastic deformation, and instantly plastically deforms. Therefore, the edge 302 of the paper 300 receives the shearing force stronger than the shearing force of a region inside the edge 302 and is more likely to be cut than in the region inside the edge 302.

In contrast, the creasing device 100 according to the present embodiment is formed such that the groove width W2 of the outside range 124*a* corresponding to the edge 302 of the paper 300 is wider than the groove width W1 of the inside range 124*b*. Accordingly, when the flange 135*c* of the rotary blade 135 starts contacting the edge 302 of the paper 300, the shearing force applied to the edge 302 is reduced, thereby preventing the paper 300 from being cut.

As described above, the creasing device 100 according to the present embodiment can prevent the paper 300 from being cut with a simple configuration where the groove width W2 of the outside range 124*a* of the groove 124 is formed to be wider than the groove width W1 of the inside range 124*b*.

Furthermore, the creasing device 100 according to the present embodiment includes the connection range 124*c* that gradually decreases in the groove width W from the wider groove width W2 to the narrower groove width W1 between the outside range 124*a* having the wider fixed groove width W2 and the inside range 124*b* having the fixed narrower groove width W1.

Here, if the creasing device includes a groove in which the outside range having the groove width W2 and the inside range 124*b* having the groove width W1 are adjacent to each other without the connection range 124*c* and a difference in level is formed such that the groove width W discretely changes, a shearing force applied to the paper 300 suddenly changes in a portion of the paper 300 that corresponds to the difference in level of the groove width W, which applies stress to the paper 300 in this portion.

However, the creasing device 100 according to the present embodiment includes the connection range 124*c* described above, and therefore, the shearing force gradually changes between the outside range 124*a* having the wider groove width W2 and the inside range 124*b* having the narrower groove width W1, thereby preventing the stress from being applied to the paper due to a sudden change in the shearing force.

Furthermore, in the creasing device 100 according to the present embodiment, the center in the groove width direction of the groove 124 in the outside range 124*a* is coincident with the center in the groove width direction of the groove 124 in the inside range 124*b*. Thereby, the crease 310 can be formed such that the center of the blade thickness of the flange 135*c* of the rotary blade 135 does not deviate from the centers in the groove width direction of the groove 124 in both the outside range 124*a* and the inside range 124*b*.

As a result, the stress applied to both edges in the width direction of the crease 310 can be uniform, thereby preventing the tearing of the paper 300 that could occur in a case where the stress is only applied to one of the edges.

In the creasing device 100 according to the present embodiment, the rotary blade 135 consists of the radial bearing in which the inner ring 135*a* and the outer ring 135*b* are combined, and the flange 135*c* is formed integrally with the outer ring 135*b*. Therefore, in the creasing device 100 according to the present embodiment, the rotary blade 135 can precisely move along the groove 124 with the simple configuration.

Figure 10:
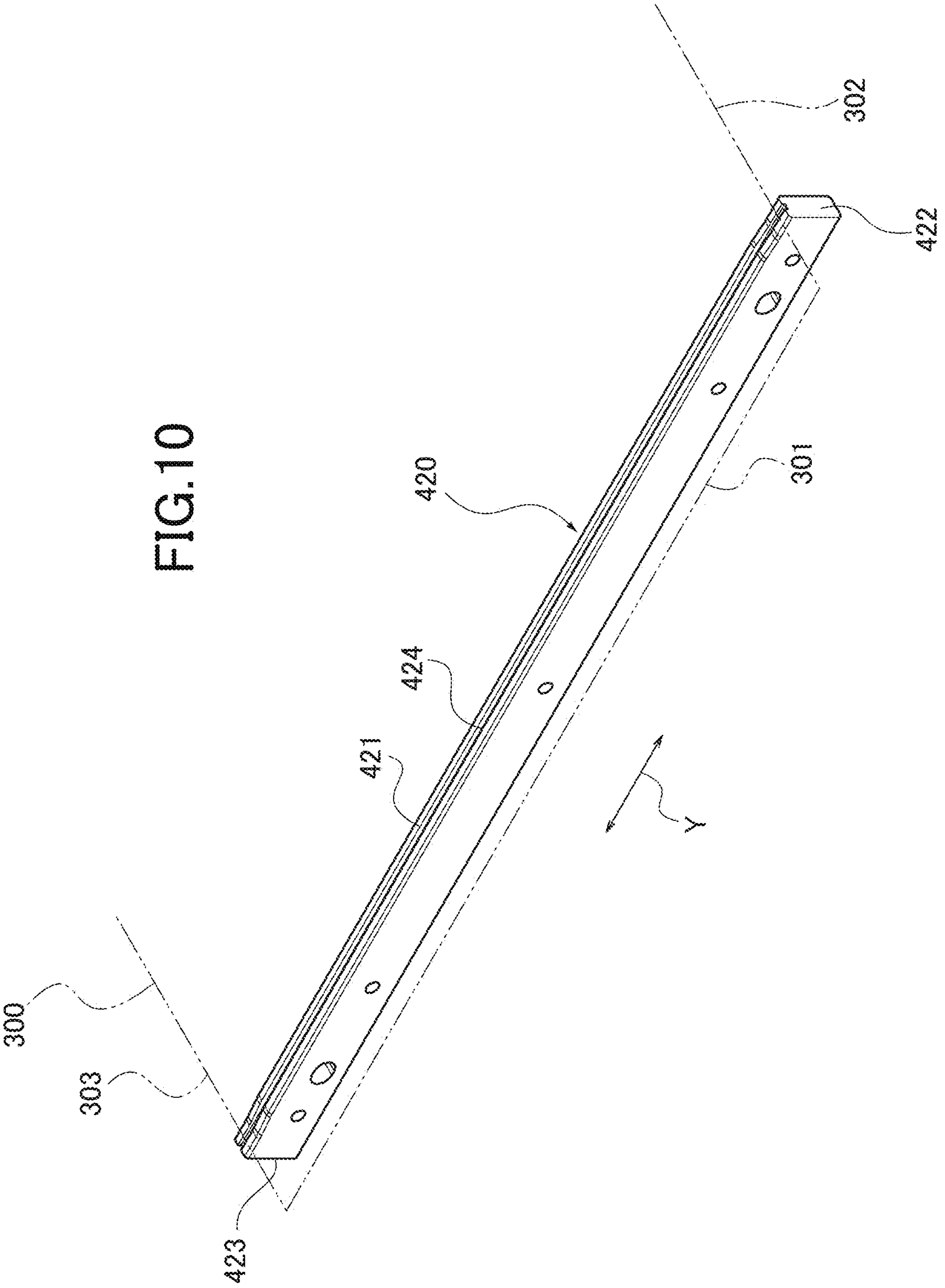
FIG. 10 is a perspective view illustrating a receiving member according to a variation.
Figure 11:
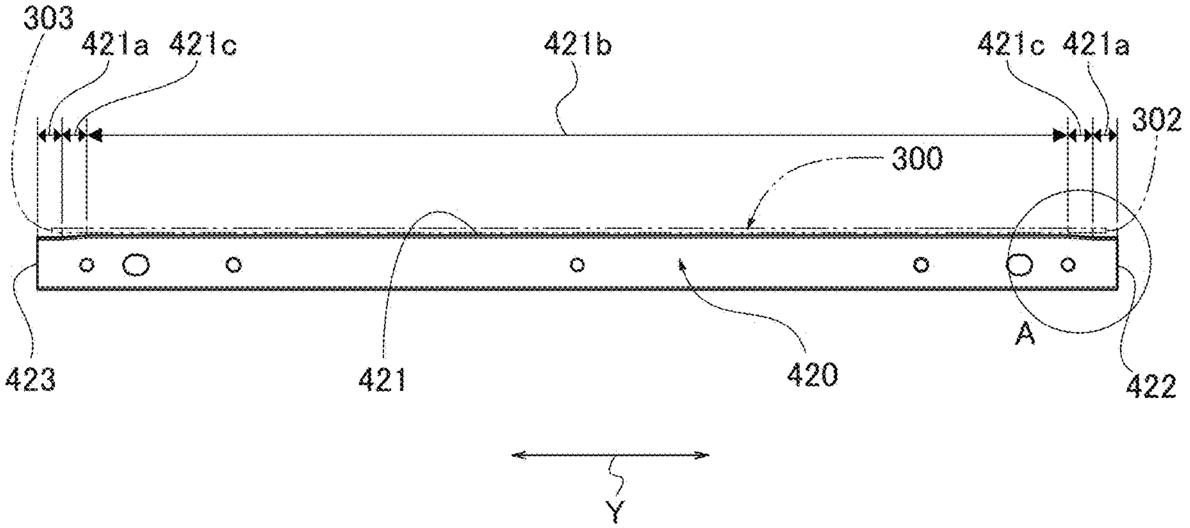
FIG. 11 is a front view illustrating the receiving member according to the variation.
Figure 12:
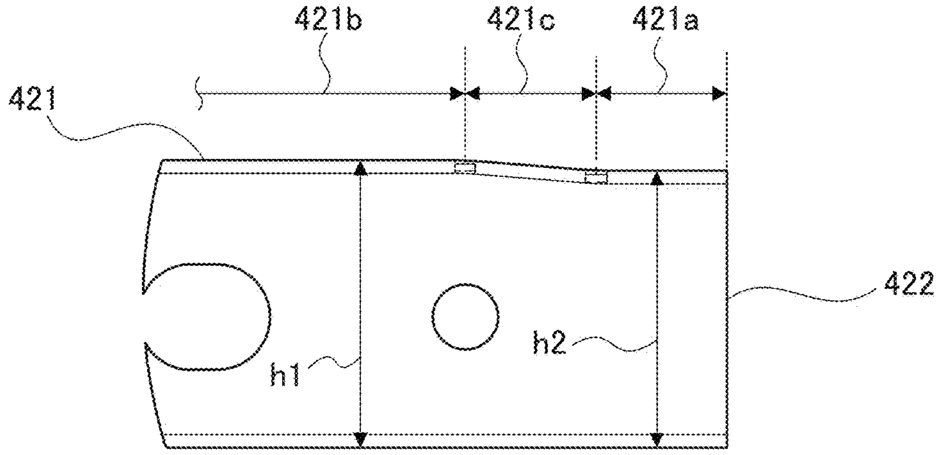
FIG. 12 is a view illustrating details of a portion A in FIG. 11.

(Variations) FIG. 10 is a perspective view illustrating a receiving member 420 that is different from the receiving member 120 in FIG. 5 in the creasing device 100 according to the first embodiment described above. FIG. 11 is a front view illustrating the receiving member 420. FIG. 12 is a view illustrating a portion A in FIG. 11.

In a variation of the creasing device 100, the receiving member 420 is used instead of the receiving member 120 in the creasing device 100 according to the embodiment.

The receiving member 420 is fixed integrally with the paper guide member 129 such that an upper surface 421 extends along a lower edge of the long hole 112 in a lower portion on the front side in the conveying direction X of the frame 110. As illustrated in FIGS. 10 and 11, the receiving member 420 has a quadrangular prism shape that extends longitudinally in the width direction Y of the paper 300. The length of the receiving member 420 in a longitudinal direction (width direction Y) is slightly longer than the width of the paper 300.

The paper 300 is placed on the upper surface 421 which is one of the surfaces of the quadrangular prism of the receiving member 420. The upper surface 421 includes a groove 424 that linearly extends in the longitudinal direction of the receiving member 420.

In contrast to the groove 124 according to the first embodiment described above, the groove 424 on the upper surface 421 of the receiving member 420 has a fixed groove width W1 having a constant width in ranges including a range having a predetermined length including a starting portion corresponding to the edge 302 in the width direction Y on a side that the rotary blade 135 starts contacting when the rotary blade 135 moves from a side of a first end surface 422 to a side of a second end surface 423 of the receiving member 420 along the groove 424 (the same as the outside range 124*a* of the first embodiment), a range having a predetermined length including a starting portion corresponding to the edge 303 in the width direction Y on a side that the rotary blade 135 starts contacting when the rotary blade 135 moves from the side of the second end surface 423 to the side of the first end surface 422 of the receiving member 420 along the groove 424 (the same as the outside range 124*a* of the first embodiment), and an inside range (same as the inside range 124*b* of the first embodiment) in the width direction Y which is a second portion.

Here, as illustrated in FIGS. 10, 11, and 12, the upper surface 421 includes ranges (outside ranges 421*a*) and an inside range 421*b*. One of the ranges (outside range 421*a*) has a predetermined length including a starting portion corresponding to the edge 302 of the paper 300 placed on the upper surface 421 having the groove 424. The edge 302 is located on a side in the width direction Y where the rotary blade 135 starts contacting when the rotary blade 135 moves from the side of the first end surface 422 to the side of the second end surface 423 along the groove 424. The range (outside range 421*a*) has a height h2. The height h2 is smaller than the height h1 of the inside range 421*b* in the width direction Y which is the second portion (h2<h1).

Also, another range (outside range 421*a*) has a predetermined length including a starting portion corresponding to the edge 303 of the paper 300 placed on the upper surface 421 having the groove 424. The edge 303 is located on a side in the width direction Y where the rotary blade 135 starts contacting when the rotary blade 135 moves from the side of the second end surface 423 to the side of the first end surface 422 along the groove 424. This range (outside range 421*a*) also has a height h2. The height h2 is smaller than the height h1 of the inside range 421*b* in the width direction Y which is the second portion (h2<h1).

Specifically, the outside range 421*a* of the upper surface 421 is lower than the inside range 421*b*, for example, by 0.2 [mm].

Here, in a case where the thickness of the paper 300 is, for example, 0.2 [mm], and a lower end of the rotary blade 135 that moves at a fixed height position is set to be lower than the upper surface 421 in the inside range 421*b* by 0.2 [mm], the lower end of the rotary blade 135 presses the upper surface of the paper 300 placed on the inside range 421*b* downward by 0.4 [mm]. On the other hand, the lower end of the rotary blade 135 presses the upper surface of the paper 300 placed on the outside range 421*a* downward by 0.2 [mm].

Accordingly, the shearing force applied to the paper 300 sandwiched between the flange 135*c* and the groove 424 in the inside range 421*b* is greater than the shearing force applied to the paper 300 sandwiched between the flange 135*c* and the groove 424 in the outside range 421*a*. As a result, the crease 310 can be formed with a clear linear contour in a range corresponding to the inside range 421*b* in the width direction Y in the paper 300.

On the other hand, the shearing force applied to the paper 300 sandwiched between the flange 135*c* and the groove 424 in the outside range 421*a* is smaller than the shearing force applied to the paper 300 sandwiched between the flange 135*c* and the groove 424 in the inside range 421*b*. As a result, the crease 310 formed at an end including the edge 302 of the paper 300 (a range corresponding to the outside range 421*a*) has a contour that is vaguer than the contour of the crease 310 formed in the range corresponding to the inside range 421*b* in the paper 300.

Accordingly, when the flange 135*c* of the rotary blade 135 starts contacting the edge 302 of the paper 300, the shearing force applied to the edge 302 becomes smaller than the shearing force of the inside range 421*b*. Therefore, the paper 300 can be prevented from being cut.

As described above, the creasing device 100 according to the variation can prevent the paper 300 from being cut with a simple configuration where the upper surface 421 in the outside range 421*a* is positioned to be lower than that in the inside range 421*b*, in comparison with a configuration where the height of the moving rotary blade 135 is changed.

Furthermore, in the creasing device 100 according to the variation, a connection range 421*c* is formed between the outside range 421*a* having the fixed height, and the inside range 421*b* having the fixed height. The connection range 421*c* gradually increases in height from the side of the outside range 421*a* to the side of the inside range 421*b*.

As a result, the shearing force gradually changes between the outside range 421*a* and the inside range 421*b*, and stress can be prevented from being applied to the paper 300 due to a sudden change in the shearing force.

The creasing devices 100 according to the embodiment and the variation described above are modulated and incorporated into the printer 200, and the movement mechanism 180 operates under the control of the controller 250 of the printer 200.

However, the creasing device 100 can be configured as a single creasing device that is independent of the printer 200, by using a configuration including an outer case that covers the entirety, and a portion relating to an operation of the movement mechanism 180 of the controller 250.

Specifically, in the creasing device 100 according to the embodiment, each of the outside ranges 124*a* at each end in the width direction Y has the wider groove width W2, and in the creasing device 100 according to the variation, each of the outside ranges 421*a* at each end in the width direction Y is formed to have the lower height h2. However, only the outside range 124*a* or 421*a* at one end in the width direction Y may have the wider groove width W2 or the lower height h2.

In this case, when creasing the paper 300, the rotary blade 135 moves from the second side edge 303 (or the first side edge 302) of the paper 300 that is located in the outside range 124*a* or 421*a* on a side having the wider groove width W2 or the lower height h2 to the first side edge 302 (or the second side edge 303) on another side in the width direction Y to crease the paper 300. Then, the rotary blade 135 is stopped in a position where the rotary blade 135 passes through the first side edge 302 (or the second side edge 303) of the paper 300 located in the outside range 124*a* or 421*a* on a side where the wider groove width W2 or the lower height h2 is not formed.

From this state, the rotary blade 135 may be moved from outside of the first side edge 302 (or the second side edge 303) of the paper 300 in the width direction Y to the second side edge 303 (or the first side edge 302) without moving the paper 300 in the conveying direction X and may be stopped in a position where the rotary blade 135 has passed through the second side edge 303 (or the first side edge 302) of the paper 300 to form the crease in a superimposed manner.

In this case, the rotary blade 135 is moved from a starting point on the side of the first side edge 302 (or the second side edge 303) of the paper 300 located in the outside range 124*a* or 421*a* where the wider groove width W2 or the lower height h2 are not provided. The rotary blade 135 moves along the crease that has already been formed on the paper 300, and therefore, a relatively great shearing force is not generated on the side of the first side edge 302 (or the second side edge 303) where the wider groove width W2 or the lower height h2 are not provided compared to the case where the crease has not been formed.

Furthermore, it is sufficient if the range where the rotary blade 135 is moved at the fixed height is at least a range between the side edges 302 and 303 of the paper 300 (a range where the paper 300 is creased). The height of the rotary blade 135 may be changed on the outsides of the first and second side edges 302, 303 of the paper 300 in the width direction Y. For example, a mechanism for raising the rotary blade 135 in a direction away from the paper 300 by a fixed height may be provided on at least one of the outside of the first side edge 302 in the width direction Y of and the outside of the second side edge 303 in the width direction Y.

Thereby, when creasing the paper 300, the rotary blade 135 is moved in the width direction Y from the second side edge 303 (or the first side edge 302) of the paper 300 at the fixed height to crease the paper 300. Then, in a position where the rotary blade 135 has passed through the first side edge 302 (or the second side edge 303) of the paper 300 and reached the outside in the width direction Y, the rotary blade 135 is raised by the fixed height from the creasing state and moved to the side of the second side edge 303 (or the first side edge 302) without contacting the paper 300 in the raised state. Then, the rotary blade 135 is lowered to the height of the creasing state on the outside in the width direction Y where the rotary blade 135 has passed through the second side edge 303 (or the first side edge 302) of the paper 300.

Then, the next paper 300 is creased at the fixed height in a state where the height of the rotary blade 135 has been lowered to the original height for creasing.

Note that the mechanism for raising the rotary blade 135 on the outside of the first side edge 302 (or the second side edge 303) of the paper 300 may increase the height of the rotary blade 135 gradually or in a stepwise manner (discretely) or continuously and smoothly.

Thus, the device for changing the height of the rotary blade 135 on the outside of the first side edge 302 (or the second side edge 303) of the paper 300 has a simpler structure compared to a device for changing the height of the rotary blade between the side edges 302 and 303 of the paper 300.

Specifically, the device for changing the height of the rotary blade between the side edges 302 and 303 of the paper 300 changes the height while moving the rotary blade in the width direction Y in contact with the paper 300 to change the shearing force, and therefore, an error of the shearing force easily increase. Therefore, it is necessary to increase the rigidity of the mechanism for changing the height of the rotary blade to reduce an error of the shearing force.

However, in the case of the device for changing the height of the rotary blade 135 on the outside of the first side edge 302 (or the second side edge 303) of the paper 300, the height of the rotary blade 135 is fixed in a range where the creasing is performed between the side edges 302 and 303 of the paper 300 (shearing force is changed by the structure of the receiving member 120 or 420).

In addition, the height of the rotary blade 135 is changed on the outside of the first side edge 302 (or the second side edge 303) of the paper 300. Therefore, there is no shear effect on the paper 300 even if the height of the rotary blade 135 is changed on the outside of the first side edge 302 (or the second side edge 303). Accordingly, the rigidity of a mechanism for changing the height of the rotary blade does not need to be increased, and a complicated structure is unnecessary.

Furthermore, even in a case where only the outside range 124*a* or 421*a* of one end in the width direction Y has the wider groove width W2 or the lower height h2, the height of the rotary blade 135 may be changed on the outside of the range between the side edges 302 and 303 of the paper 300.

In this case, when creasing the paper 300, the rotary blade 135 moves at the fixed height from the second side edge 303 (or the first side edge 302) of the paper 300 located in the outside range 124*a* or 421*a* on the side where the wider groove width W2 or the lower height h2 is formed to the first side edge 302 (or the second side edge 303) in the width direction Y to crease the paper 300. Then, the rotary blade 135 is raised by the fixed height from the creasing state in a position where the rotary blade 135 has passed through the first side edge 302 (or the second side edge 303) of the paper 300 located in the outside range 124*a* or 421*a* on the side without the wider groove width W2 or the lower height h2 and reached the outside in the width direction Y.

Then, the rotary blade 135 is moved to the side of the second side edge 303 (or the first side edge 302) in the raised state without contacting the paper 300 and lowered to the original height for the creasing state on the outside in the width direction Y where the rotary blade 135 has passed through the second side edge 303 (or the first side edge 302) of the paper 300 to crease the next paper 300 at the fixed height.

Figure 13:
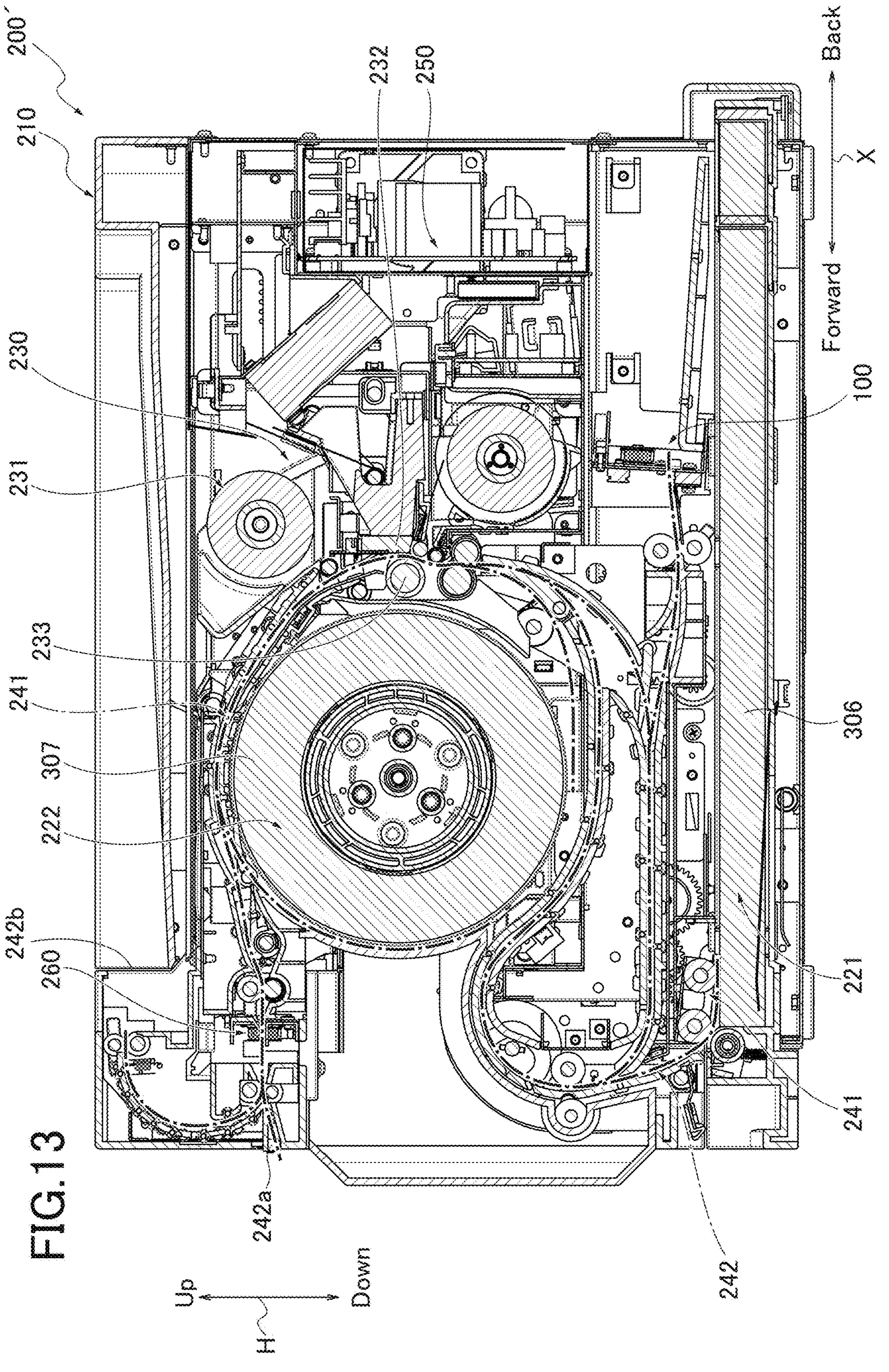
FIG. 13 is a view illustrating an example of an arrangement of the paper creasing device in a photo printer.

(Another Example of Arrangement of Creasing Device in Printer) FIG. 13 is a vertically cross-sectional view illustrating another photo printer 200' (hereinafter referred to as a printer 200') including the creasing device 100 and illustrates an arrangement example of the creasing device 100 in the printer. The printer 200' is another embodiment of the printer according to the present disclosure.

In the printer 200 illustrated in FIG. 1, the creasing device 100 is disposed in a position close to the cutter 260 provided near a discharge port of the paper 300 in the printer 200, that is, on the upper side on the front side of the printer 200.

On the other hand, in the printer 200' illustrated in FIG. 13, the creasing device 100 is disposed in a lower portion of the printer 200' and vicinity of the center of the printer 200' in the forward/backward direction (a conveying direction X). Here, the printer 200' is a sublimation-type thermal transfer printer similar to the printer 200. The printer 200' can select paper 300 to be printed from a flat sheet 306 which is cut paper and a rolled paper 307 which is formed into a roll by rolling a single long sheet of paper into a belt shape.

The printer 200' includes an outer case 210, a flat sheet storage portion 221, a rolled paper storage portion 222, a printing portion 230, a cutter 260, a creasing device 100, a conveyor portion 240 including conveying means 241 and a conveying path 242, and a controller 250. The printing portion 230, the cutter 260, and the controller 250 in the printer 200' are respectively disposed in positions similar to the positions of the printing portion 230, the cutter 260, and the controller 250 in the printer 200.

The flat sheet storage portion 221 is a paper storage portion that stores a large number of flat sheets 306 stacked in a thickness direction. The flat sheet storage portion 221 is disposed in the lowermost portion of the printer 200' similar to the paper storage portion 220 in the printer 200 illustrated in FIG. 1. The rolled paper storage portion 222 is a paper storage portion (or space) that stores the rolled paper 307. The rolled paper storage portion 222 is disposed in a position in front of the printing portion 230 and above the flat sheet storage portion 221 in the printer 200'.

The printer 200' includes a front discharge port 242*a* and an upper discharge port 242*b*. The front discharge port 242*a* is configured to discharge the flat sheet 306 or the rolled paper 307 after being printed by the printing portion 230 forward to the outside. The upper discharge port 242*b* is configured to discharge the flat sheet 306 or the rolled paper 307 rearward onto a discharge tray. The front discharge port 242*a* is provided on the front side and the upper portion of the printer 200'. The upper discharge port 242*b* is provided in an upper portion of the printer 200' to open in a rearward direction. The controller 250 alternatively switches the front discharge port 242*a* and the upper discharge port 242*b* to discharge the flat sheet 306 or the rolled paper 307 to the outside in front of the printer 200' or onto the discharge tray in the upper portion of the printer 200'.

As illustrated in FIG. 13, the creasing device 100 is disposed in the vicinity of the center in the forward/backward direction (the conveying direction X) of the printer 200' and on a rear side in the forward/backward direction of the rolled paper storage portion 22. Furthermore, with regard to the height direction (a vertical direction) H of the printer 200', the creasing device 100 is disposed in a position above the flat sheet storage portion 221 provided in the lowermost portion of the printer 200' and below the printing portion 230 provided with the ink ribbon 231 or the thermal head 232.

The position where the creasing device 100 is disposed is a region that is likely to be a dead space in the printer 200'. Accordingly, the creasing device 100 can be added without increasing in size in the forward/backward direction of the printer 200', and a space in the printer 200' can be effectively used.

Furthermore, the creasing device 100 is disposed in the vicinity of the center of the printer 200' in the forward/backward direction. Therefore, the crease 310 can be formed near one end of the flat sheet 306 in the conveying direction X that passes through a creasing path extending to the rear side in the forward/backward direction below the rolled paper storage portion 222 in the conveying path 242. Also, the crease 310 can be formed in the center of the flat sheet 306 in the conveying direction X.

The creasing device 100 forms the crease 310 near the end of the flat sheet 306 in the conveying direction X. Therefore, for example, when a plurality of printed flat sheets 306 is bundled to form a photo book, the spreadability of each of the flat sheets 306 can be improved. Furthermore, the crease 310 is formed near the center of the flat sheet 306 in the conveying direction X. Therefore, a fold can be formed at the center of a card such as a greeting card formed by using a single flat sheet 306, for example.

The invention claimed is:

1. A paper creasing device comprising:

a receiving member that is configured to receive paper thereon, the receiving member comprising a groove extending in a longitudinal direction of the receiving member, wherein the longitudinal direction of the receiving member corresponds to a paper width direction of the paper;

a rotary blade that is movable along the groove; and a movement mechanism that is configured to move the rotary blade along the groove at a fixed height in a range between first and second edges of the paper in the paper width direction of the paper, the paper being placed on an upper surface of the receiving member, wherein when the paper is creased, the paper is sandwiched between the rotary blade and the groove, and the receiving member is formed such that a shearing force applied to the paper during the creasing is smaller in an outside range than in an inside range in the longitudinal direction of the receiving member, the outside range corresponding to at least one of the first and second edges of the paper that is located on a side where the rotary blade starts contacting the paper when the rotary blade moves along the groove, wherein the groove comprises a first groove width in the outside range and a second groove width in the inside range in the longitudinal direction of the receiving member, and wherein the first groove width is wider than the second groove width in a groove width direction of the groove, the groove width direction being perpendicular to the longitudinal direction of the receiving member.

2. The paper creasing device according to claim 1, further comprising a connection range between the outside range and the inside range, wherein the groove comprises a third groove width along the connection range, the third groove width gradually decreasing from the first groove width in the outside range to the second groove width in the inside range.

3. The paper creasing device according to claim 2, wherein the grooves is formed such that a center of the first groove width is coincident with a center of the second groove width direction in the groove width direction.

4. The paper creasing device according to claim 1, wherein the rotary blade is formed with a radial bearing comprising combined inner and outer rings.

5. The paper creasing device according to claim 1, wherein a height of the upper surface of the receiving member in the outside range is lower than a height of the upper surface of the receiving member in the inside range in the longitudinal direction of the receiving member.

6. A printer comprising the paper creasing device according to claim 1.

* * * * *